(12) United States Patent
Poole

(10) Patent No.: US 6,758,982 B2
(45) Date of Patent: Jul. 6, 2004

(54) INTEGRATED DEBRIS MANAGEMENT METHOD

(75) Inventor: Gary Lane Poole, Willis, TX (US)

(73) Assignee: BJ Services Company, Houston, TX (US)

( * ) Notice: Subject to any disclaimer, the term of this patent is extended or adjusted under 35 U.S.C. 154(b) by 0 days.

(21) Appl. No.: 10/667,991

(22) Filed: Sep. 22, 2003

(65) Prior Publication Data

US 2004/0055945 A1 Mar. 25, 2004

Related U.S. Application Data

(62) Division of application No. 09/970,362, filed on Oct. 3, 2001, now Pat. No. 6,641,730.

(51) Int. Cl.[7] .......................... B01D 36/04; E21B 21/06
(52) U.S. Cl. ...................... 210/804; 210/747; 210/806; 210/170; 210/196; 210/300; 210/301; 175/66; 175/206
(58) Field of Search ................................. 210/804, 747, 210/806, 170, 196, 300, 301; 175/66, 206

(56) References Cited

U.S. PATENT DOCUMENTS

| | | | |
|---|---|---|---|
| 2,156,333 A | 5/1939 | Cross et al. | |
| 2,479,061 A | 11/1949 | Denton | |
| 3,737,037 A | 6/1973 | Bone, III | |
| 3,766,997 A | 10/1973 | Heilhecker et al. | |
| 4,352,739 A | 10/1982 | Oliver, Jr. et al. | |
| 4,428,428 A | 1/1984 | Smyrl et al. | |
| 4,456,061 A | 6/1984 | Swift, Jr. et al. | |
| 4,560,483 A | 12/1985 | Warning et al. | |
| 5,570,749 A | 11/1996 | Reed | |
| 5,582,727 A | 12/1996 | Foster | |
| 5,674,403 A | 10/1997 | Kinney | |
| 5,906,733 A | 5/1999 | Purvey | |
| 5,924,487 A | 7/1999 | Oneal et al. | |
| 6,517,733 B1 | 2/2003 | Carlson | |

Primary Examiner—Thomas M. Lithgow
(74) Attorney, Agent, or Firm—Locke Liddell & Sapp LLP

(57) ABSTRACT

A fluid filtration system of well workover fluids, the system comprising: a first settling tank which stores fluid; a second settling tank which stores fluid; a low pressure pump in fluid communication with the first and second settling tanks; a low pressure filter in fluid communication with the first and second settling tanks; a high pressure pump in fluid communication with the second settling tank; and a high pressure filter in fluid communication with the second settling tank, wherein the high pressure filter comprises: an inlet; an outlet; a plurality of input feed lines in fluid communication with the inlet; a plurality of output feed lines in fluid communication with the outlet; a plurality of filter canisters, wherein at least one filter canister is in fluid communication with each input feed line and each output feed line.

5 Claims, 8 Drawing Sheets

PLAN VIEW

INLET ELEVATION

SIDE ELEVATION

OUTLET ELEVATION

INTEGRATED DEBRIS MANAGEMENT METHOD

BACKGROUND OF THE INVENTION

The present invention relates generally to a system and method for removing solid debris from completion fluids being pumped through a surface drilling rig circulation system prior to flowing downhole.

In the prior art, when debris is pumped or introduced downhole, such debris or trash becomes lodged in downhole equipment or production tools and impairs their performance or causes failure. Free floating debris such as drilling mud solids, paint chips, pipe dope, metal shavings, rust shale, fibers and other associated debris are typically found in the completion fluids. Accumulation of this collective array of debris will lead to equipment failure as previously noted.

As shown in FIG. 1, prior art workover systems typically comprise first and second settling tanks 2 and 3, a low pressure pump 4, a low pressure filter 5, and a high pressure pump 6. The low pressure pump 4 and low pressure filter 5 transport and purify the workover fluid from settling tank 2 to settling tank 3. A high pressure pump 6 draws workover fluid from settling tank 3 for insertion into the well Christmas tree 8 located at the top of the wellbore casing 7. A high pressure conduit 10 extends from the high pressure pump 6 to the Christmas tree 8. The systems further comprise a return conduit 9 which extends from the Christmas tree 8 to the first settling tank 2. Relatively dirty completion fluid is drawn from the Christmas tree and pumped into the first settling tank 2, where the bulk of the debris settles out of the fluid. Completion fluid is then pumped out of the top of the first settling tank 2 so as to withdraw as little of the debris as possible with the completion fluid. As the completion fluid is withdrawn from the first settling tank 2, it is filtered by the low pressure filter 5 to remove any debris suspended in the completion fluid. This filtered completion fluid is pumped into the second settling tank 3 to allow any remaining debris to settle out of the fluid.

Low pressure filtration systems for implementation between the first and second settling tanks 2 and 3 are known. For example, U.S. Pat. No. 4,352,739, incorporated herein by reference, discloses a liquid cleaning system for liquid that is substantially continuously circulated and which becomes contaminated with solid particulate and debris during circulation. The liquid cleaning system, which is particularly advantageous to cleaning liquid that is circulated within a petroleum wellbore during completion and workover activities, incorporates a vibratory screen separator for accomplishing preliminary separation of large particulate and debris from the contaminated liquid and which also incorporates a filtration bank having a plurality of filters that are each interconnected with inlet discharge and drain headers. The filter bank incorporates a valving system having the capability of accomplishing backflushing by circulating clean fluid in reverse manner through selected ones of the filters to remove collected solid particulate therefrom and transport the removed particulate to the drain header.

Similarly, U.S. Pat. No. 4,560,483, incorporated herein by reference, discloses a filtering system using at least two filter vessels with a plurality of filter elements having absolute filtration capability. The filter elements use a nominal filter of diatomaceous earth or a perlite filter and a precoat layer, an outer wire layer, an absolute filter layer, a fine wire layer, a course wire layer, and a tube core for receiving filter flow therein. A pump is provided for injecting a predetermined amount of filter aid to a precoat tank containing clean fluid. The slurry of filter aid and clean fluid is then pumped into one of the filter vessels for precoating the filter elements. The unfiltered fluid is then allowed to enter the vessel and to be filtered through the filtering elements while virgin filter aid is continuously injected into the unfiltered fluids prior to the fluids entering the filter vessel. This apparatus is used for filtering completion and workover fluids utilized during oil and gas well drilling and completion operations.

Another example is found in U.S. Pat. No. 4,456,061, incorporated herein by reference. This patent discloses well cleaning circulation fluids and production or workover processes. In particular, a cylindrical housing is adapted to receive and discharge fluid in a subterranean well. In a preferred form, a plate is positioned in the cylinder separating it into first and second chambers. Filter adapter receiving means are disposed across the plate, with a filter adapter securable therein, the adapter having a passageway extending to the chambers. The adapter has a cylindrical housing having an enlarged cartridge positioning portion. A grooveway is defined on the adapter extending exteriorly therearound for securing one end of a secondary cartridge filter. A secondary cartridge filter has an inner filter completely surrounded by a replaceable and reuseable primary sleeve filter and is positionable on the adapter, the filter providing a seal having an interiorly facing circumferentially extending lip for contact with the exterior of the cylindrical housing when the filter is located on the adapter, for sealingly securing the filter to the adapter.

While many filter systems are known throughout the industry for filtering the circulation fluid in the settling tanks, these systems are not completely effective in removing debris from the completion fluid as the fluid is pumped into the wellbore. In particular, because the settling tanks are sometimes located several hundred feet away from the well being worked over, the high pressure conduit 10 can retain a fair amount of debris which is carried by the completion fluid into the well. Therefore, there is a need for a filtration system and method which more effectively removes debris and particulates from the completion fluid prior to the fluid being introduced into the well.

SUMMARY OF THE INVENTION

To satisfy this need in the well completion fluid circulation field, a high pressure filtration system is placed in the high pressure conduit immediately upstream from the Christmas tree. This high pressure filtration system cleans fine particulates and debris from the circulation fluid as high volumes of circulation fluid rapidly pass through the filtration system under high pressure.

According to one aspect of the invention, there is provided a fluid filtration system of well workover fluids, the system comprising: a first settling tank which stores fluid; a second settling tank which stores fluid; a low pressure pump in fluid communication with the first and second settling tanks; a low pressure filter in fluid communication with the first and second settling tanks; a high pressure pump in fluid communication with the second settling tank; and a high pressure filter in fluid communication with the second settling tank, wherein the high pressure filter comprises: an inlet; an outlet; a plurality of input feed lines in fluid communication with the inlet; a plurality of output feed lines in fluid communication with the outlet; a plurality of filter canisters, wherein at least one filter canister is in fluid communication with each input feed line and each output feed line.

According to a further aspect of the invention, there is provided an in-line, high-pressure, fluid filter of well workover fluids, the filter comprising: an inlet; an outlet; and a high pressure filter canister in fluid communication with the inlet and the outlet, the filter canister comprising a perforated base pipe and a media screen.

According to still anther aspect of the invention, there is provided a high pressure fluid filter of well workover fluids, the filter comprising: an inlet; an outlet; and a high pressure filter canister in fluid communication with the inlet and the outlet, the filter canister comprising a perforated base pipe and a media screen; a plurality of input feed lines in fluid communication with the inlet; a plurality of output feed lines in fluid communication with the outlet; and a plurality of high pressure filter canisters, wherein at least one filter canister is in fluid communication with each input feed line and each output feed line.

According to another aspect of the invention, there is provided a process for filtering fluid for circulation in a well, the process comprising: standing the fluid a first time, whereby debris in the fluid is allowed to settle; filtering under a first pressure the fluid of the standing the fluid a first time, whereby further debris is removed from the fluid; standing the fluid a second time, whereby further debris is allowed to settle; and filtering the fluid of the standing the fluid a second time under second pressure, wherein the second pressure is higher than the first pressure, whereby further debris is removed from the fluid.

The high pressure filter of the present invention withstands high working pressures and also withstands high velocity erosion associated with high debris loading. Debris such as barite from drilling mud, frac sand or bauxite pumped at high rates could erode or wear a hole in the metal filter canisters leading to plugged or serious reduction of hydrocarbon formations with the producing reservoir.

BRIEF DESCRIPTION OF THE DRAWINGS

The present invention is better understood by reading the following description of non-limitative embodiments with reference to the attached drawings wherein like parts in each of the several figures are identified by same reference characters, and which are briefly described as follows.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

Figure 1:
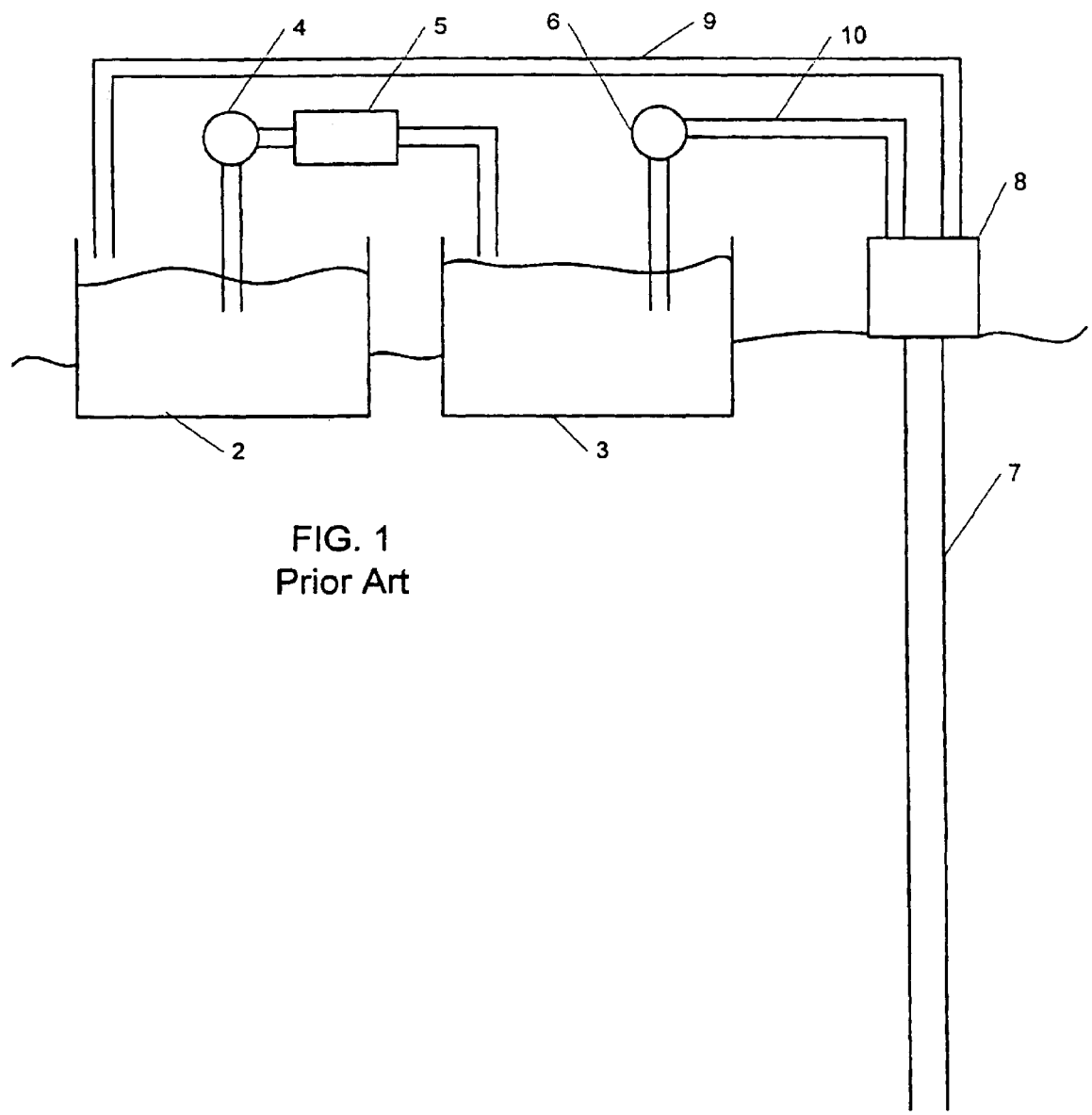
FIG. 1 is a schematic depiction of a completion and/or workover system as is known in the prior art.
Figure 2:
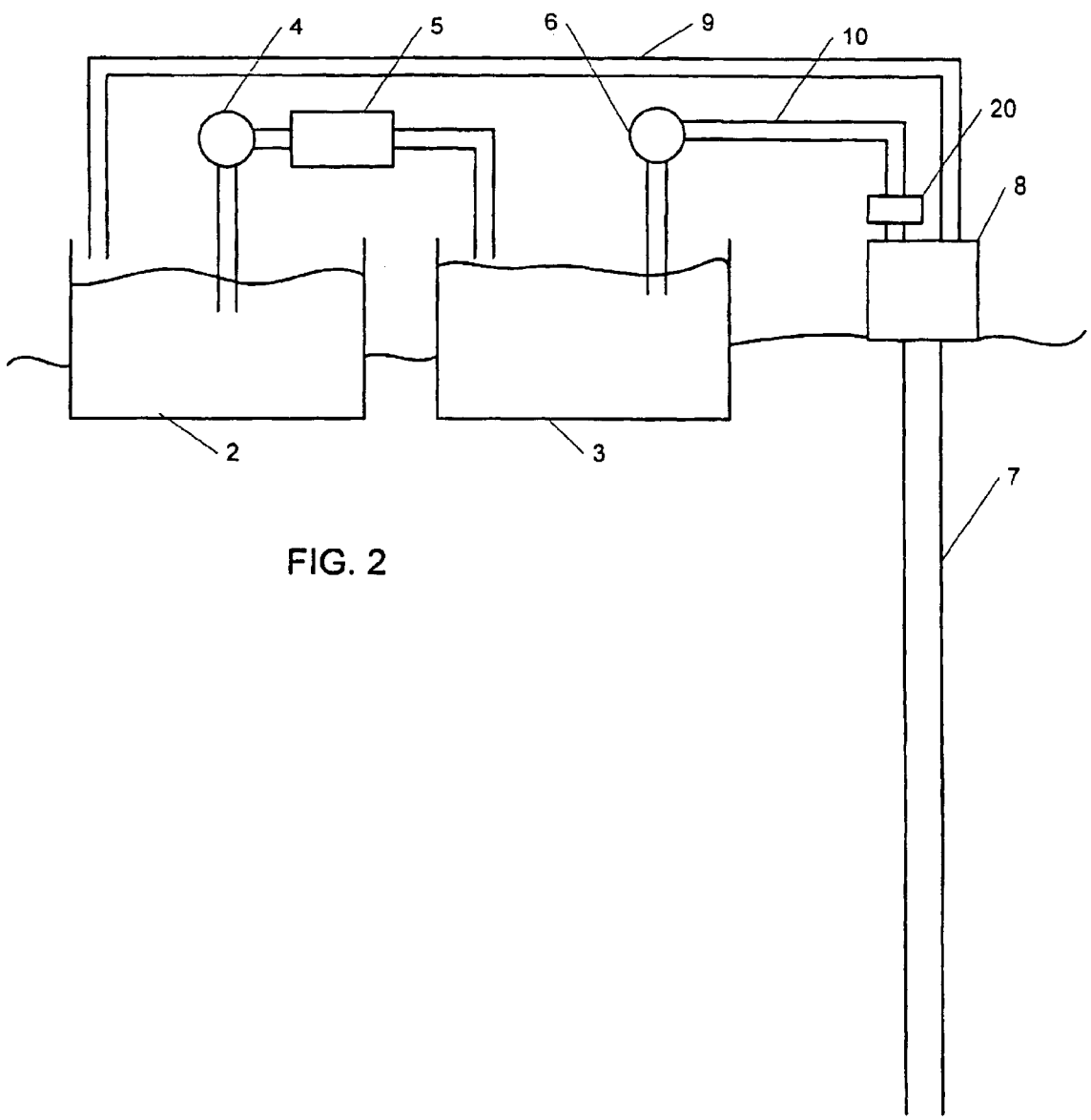
FIG. 2 is a schematic depiction of a filtration system for a completion and/or workover system according to the present invention.

Referring to FIG. 2, a schematic diagram of an embodiment of the present invention is shown. A first settling tank 2 is shown containing circulation and/or completion fluid. A low pressure pump 4 draws circulating fluid from the first settling tank 2 and pumps it through a low pressure filter 5. This filtered circulating fluid is deposited in a second settling tank 3. A high pressure pump 6 draws circulating fluid from the second settling tank 3 and pumps it through a high pressure conduit toward the Christmas tree 8. Immediately upstream from the Christmas tree 8, there is a high pressure filter 20 connected in line with the high pressure conduit 10. A return conduit 9 extends from the Christmas tree 8 to the first settling tank 2 for returning circulation fluid from the wellbore casing 7 to the first settling tank 2.

Figure 3:
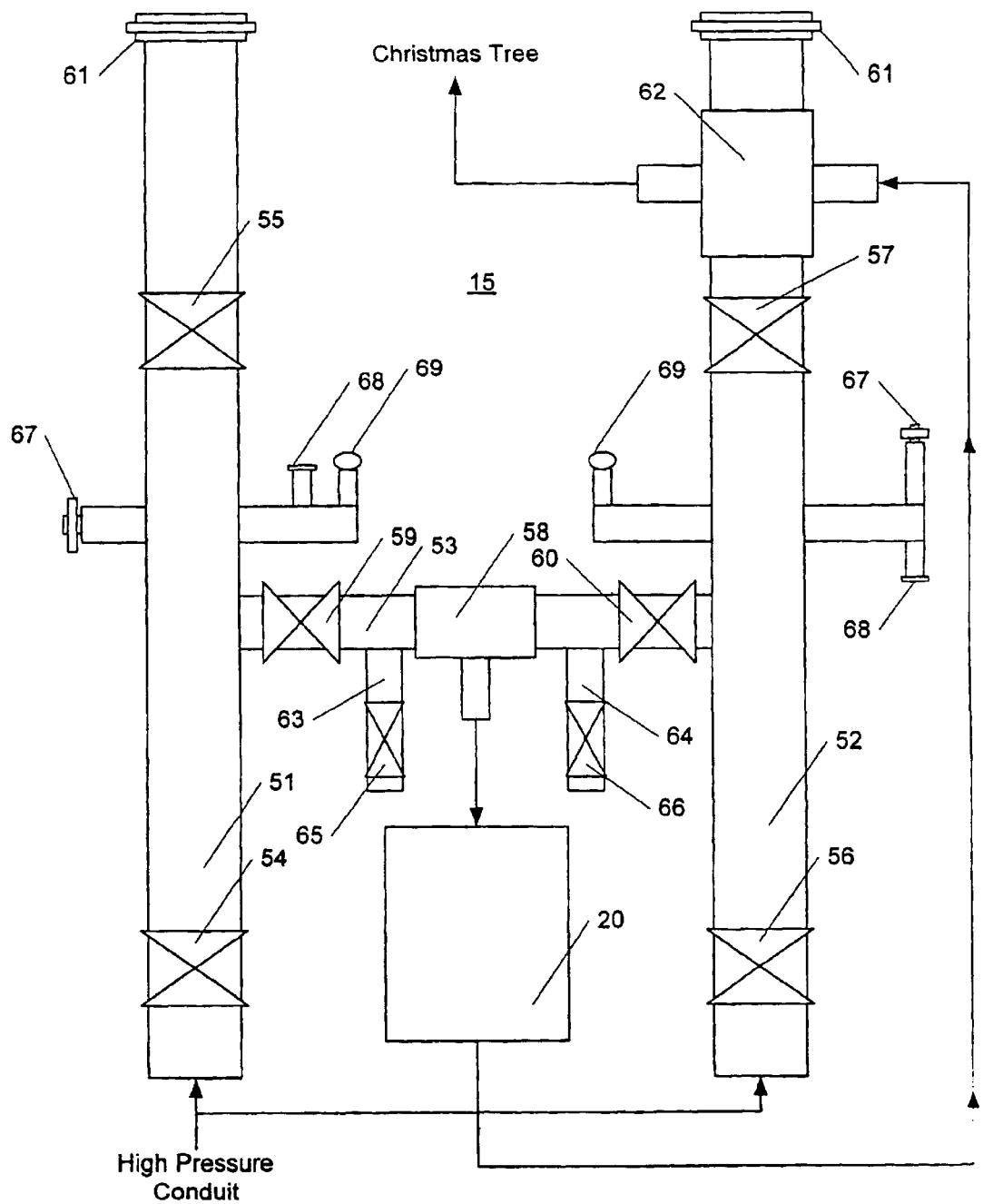
FIG. 3 is a schematic representation of a saddle manifold for connecting the filtration system to the high pressure conduit between the high pressure pump and the Christmas tree.
Figure 4A:
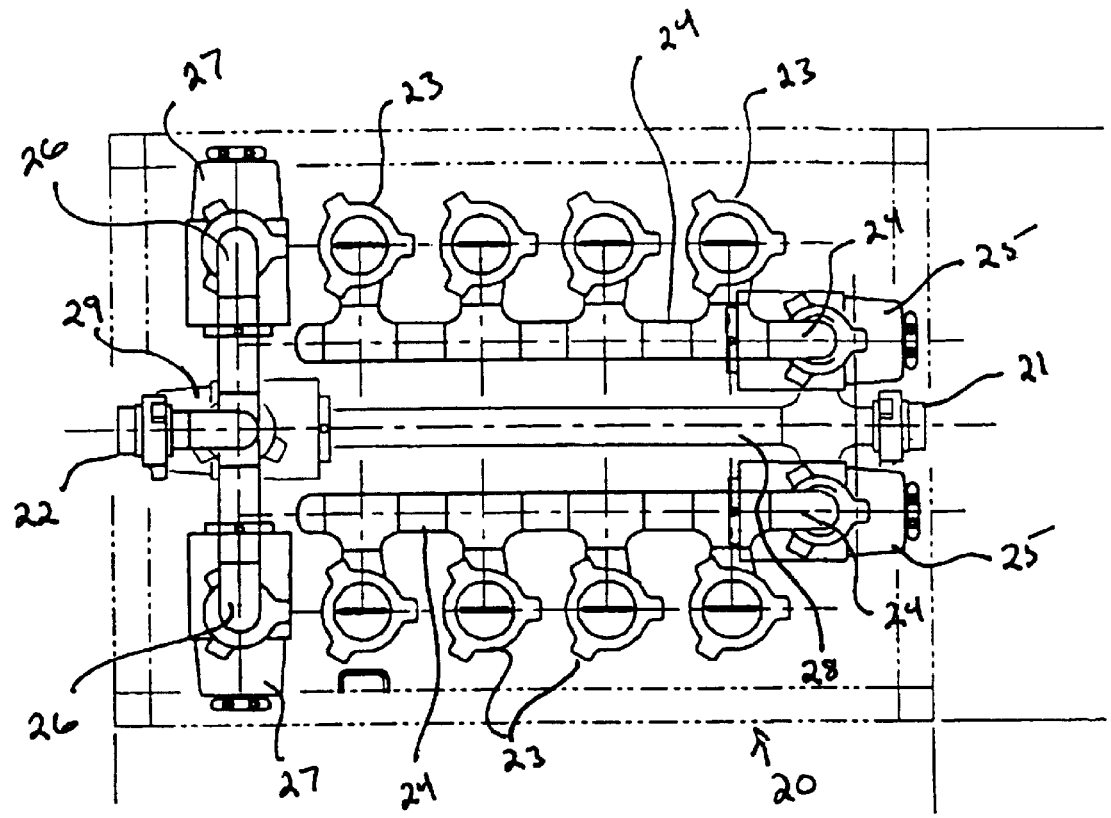
FIG. 4A plan view of the high pressure filtering device of the present invention.
Figure 4B:
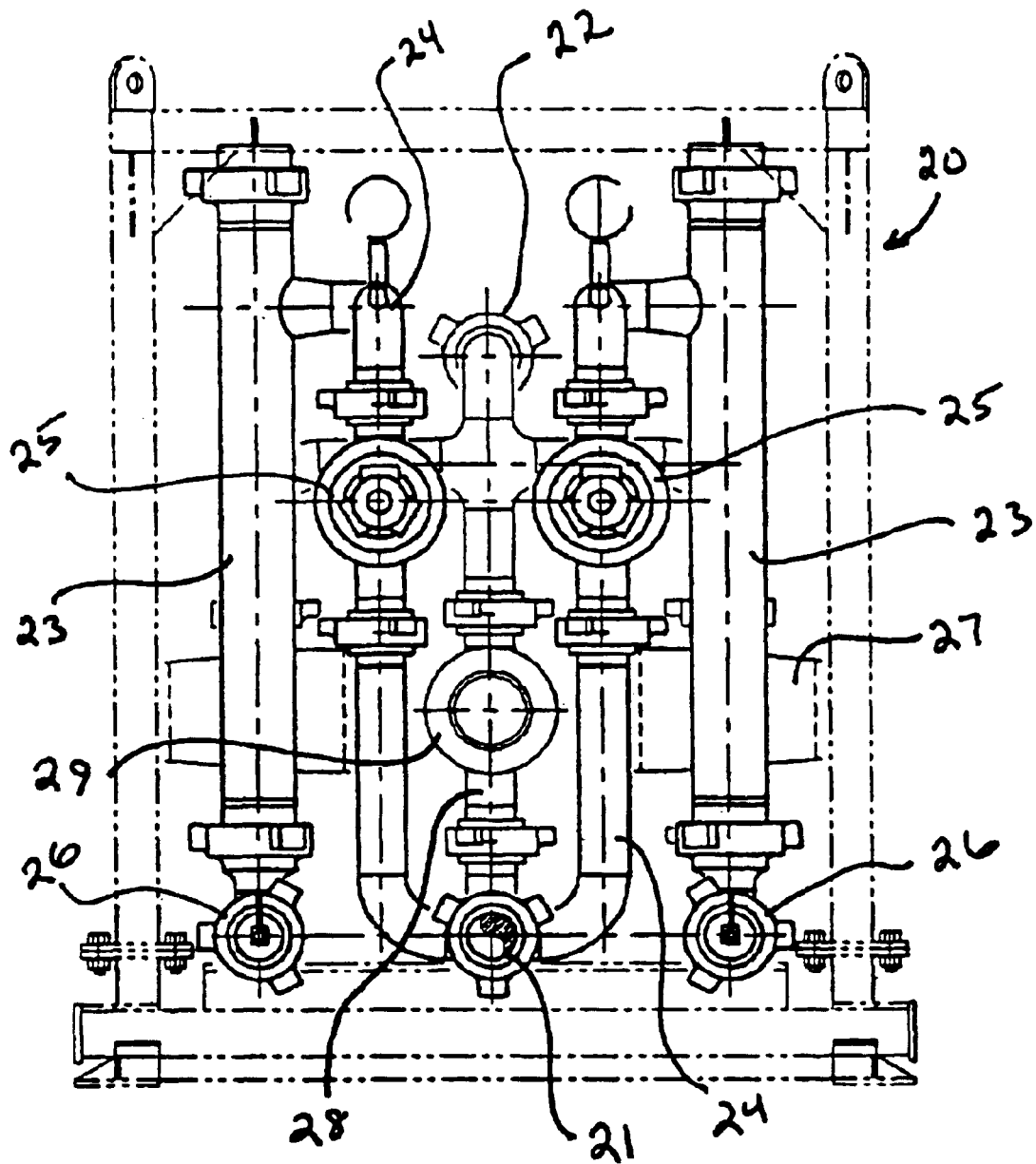
FIG. 4B is an inlet elevation of the high pressure filtering device of the present invention shown in FIG. 4A.
Figure 4C:
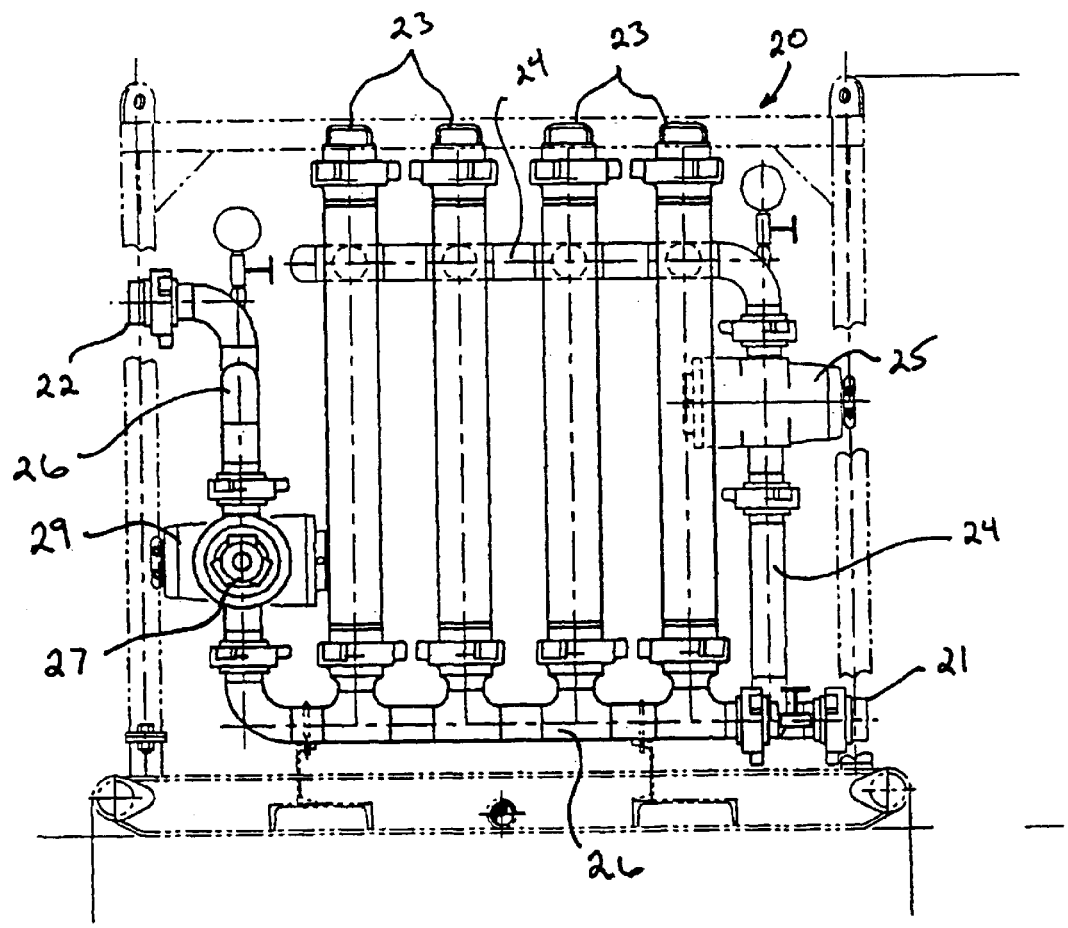
FIG. 4C is a side elevation of the high pressure filtering device shown in FIGS. 4A and 4B.
Figure 4D:
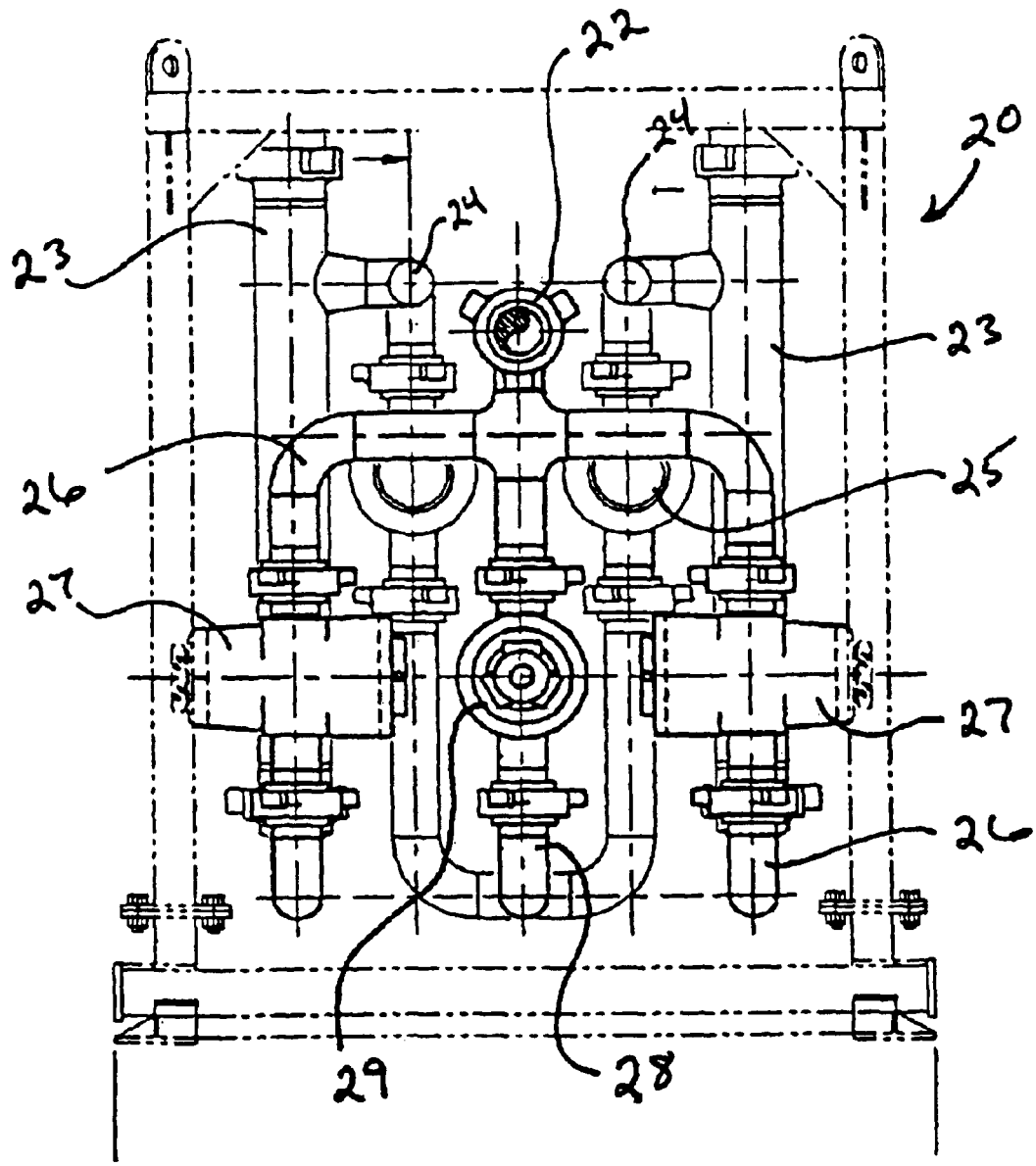
FIG. 4D is an outlet elevation of the high pressure filtering device shown in FIGS. 4A–4C.

As shown in FIG. 3, according to one embodiment of the invention, a saddle manifold system 15 is used to connect the high pressure filter 20 to the high pressure conduit 10 (not shown). In one embodiment of the invention, the saddle manifold system 15 is a high pressure junction device constructed of 5", 3" and 2" pipe that is fitted and welded to the high pressure conduit 10. The saddle manifold system 15 provides multiple flow communications of completion fluids to and from the high pressure filter 20 through the saddle manifold system 15 and downhole through the Christmas tree 8.

Fluid manipulation or stream flow direction is achieved with high pressure valves as shown in FIG. 3. Debris filled completion fluids flow from the high pressure pump 6 (see FIG. 2) through the high pressure conduit 10 to the saddle manifold system 15.

A bypass stand pipe 51 of the saddle manifold system 15 is connected at one end to the high pressure conduit 10 and at the other end it is capped with a cap 61. The saddle manifold system 15 also has a filter stand pipe 52, wherein a cross pipe 53 connects the two stand pipes 51 and 52. The bypass stand pipe 51 has valves 54 and 55, wherein the valves are positioned opposite the junction with the cross pipe 53, respectively. Similarly, the filter stand pipe 53 has 56 and 57 positioned opposite the junction with the cross pipe 53, respectively. The filter stand pipe 52 is connected to the high pressure conduit 10 at one end and is capped with a cap 61 at the other end. Fluid flows from the filter stand pipe 52 to the Christmas tree (see FIG. 2) through an exit junction 62. The cross pipe 53 has a filter junction 58 for connecting the cross pipe 53 to the high pressure filter 20. The cross pipe 53 also has two valves 59 and 60 which are positioned opposite the filter junction 58. The cross pipe 53 also has a test line 63 with a test valve 65 and a fill up line 64 with a fill up valve 66. The stand pipes 51 and 52 also each have a union 67, a plug 68, and a plugged line 69, all of these being useful for flushing and monitoring procedures.

In one embodiment of the invention, the stand pipes 51 and 52 are 5" pipes and the cross pipe 53 is a 3" pipe. The test line 63, fill up line 64, unions 67 and plugs 68 are all 2".

The saddle manifold system 15 operates by opening the valve 53 on the bypass stand pipe 51 and closing the valve 55 of the same pipe. The fluid flows into the cross pipe 53 through the open valve 59 and into the filter junction 58. The valve 60 on the cross pipe 53 is closed to force the fluid from the filter junction 58 into the high pressure filter 20. In one embodiment, fluid flows through the high pressure filter 20 by way of 3" chicksans lines rated to 15,000 psi. and then filtered clean fluid is feed to the filter stand pipe 52 by 3"

chicksans to the exit junction 62. Note that the valves 56 and 57 located above and below the T manifold on filter stand pipe 52 are closed to prevent fluids from flowing down or into the filter stand pipe 52. The test line 63 and fillup line 64 are test lines and feed lines that allow the high pressure filter 20 to be back flushed.

Referring to FIGS. 4A–4D, an embodiment of the high pressure filter 20 is described. The high pressure filter 20 comprises an inlet 21 and an outlet 22. The high pressure filter 20 also has, according to this embodiment, eight filter canisters 23. As shown in the drawings, the filter canisters 23 are oriented vertically. The inlet 21 is connected to the tops of the filter canisters 23 by two input feed lines 24. The input feed lines are each equipped with an input valve 25. The outlet 22 is connected to the bottoms of the filter canisters 23 by two output feed lines 26. The output feed lines 26 are each equipped with an output valve 27. The high pressure filter 20 also comprises a by-pass line 28 which extends from the inlet 21 to the outlet 22. the by-pass line 28 also has a by-pass valve 29.

The high pressure filter 20 operates by flowing completion fluids into the inlet 21. In a filter configuration, the by-pass valve 29 is closed and the input and output valves 25 and 27 are all open. In this configuration, completion fluid flows from the inlet 21, through the input feed lines 24, through the filter canisters 23, through the output feed lines and out the outlet 22. In a by-pass configuration, the by-pass valve 29 is open and the input and output valves 25 and 27 are all closed. In this configuration, completion fluid is prevented from flowing through the filter canisters 23 and is instead routed through the by-pass line 28.

A further valve configuration allows an operator to keep the high pressure filter 20 online (filtering the completion fluid) and simultaneously change out a filter in a filter canister 23 in case a filter becomes plugged. For example, if a filter canister 23 becomes plugged, the side of the high pressure filter 20 having the plugged filter canister 23 may be closed while the other side remains open. In particular, on the side of the high pressure filter 20 with the plugged filter canister 23, the input valve 25 and output valve 27 are closed to isolate all of the filter canisters 23 on that side. The remaining filter canisters 23 on the other side of the high pressure filter 20 remain open and flowing to filter the completion fluid. This enables an operator to replace a plugged filter in a filter canister 23 without taking the entire high pressure filter 20 offline.

In alternative embodiments of the invention, the high pressure filter 20 has more than two sides. For example, an alternative embodiment has three or more input feed lines 24 and three or more output feed lines 26. Further, while four filter canisters 23 are shown in the illustrative embodiment above, in alternative embodiments of the invention, any number of filter canisters 23 are placed in the system between an input feed line 24 and an output feed line 26.

Figure 5:
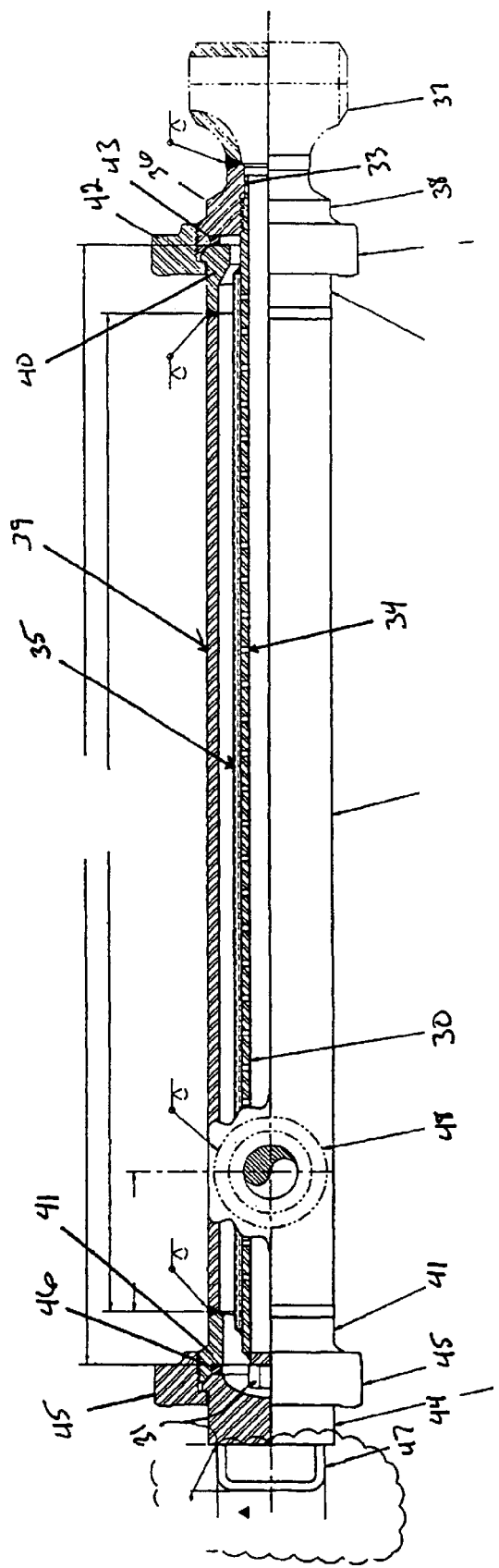
FIG. 5 is a cross-sectional side view of a filter canister of the present invention.

Referring to FIG. 5, a side cross-sectional view of filter canister 23 of the present invention is shown. The filter canister 23 contains a complete filter system having various components. The embodiment shown in FIG. 5 has a base pipe 30 with a hex nut 31 welded on one end and a threaded section 32 formed on the other. A base pipe seal 33 is also located on the base pipe 30 on the same end as the threaded section 32. The base pipe seal 33 comprises a groove in the base pipe 30 with an O-ring placed in the groove. The base pipe 30 also comprises perforations or holes 34 at various points along the length of the base pipe 30. A media screen 35 is applied to the exterior of the base pipe 30. The threaded end of the base pipe 30 is threaded into an output T-pipe 36. The output T-pipe 36 has two sections, the T-pipe 37 and the threaded flange 38, wherein the threaded flange 38 has both exterior male threads and interior female threads. As shown in FIG. 5, the threaded section 32 of the base pipe 30 is threaded into the female threads of the threaded flange 38 of the output T-pipe 36. The base pipe seal 33 forms a seal between the base pipe 30 and the output T-pipe 36.

The filter canister 23 also has an exterior housing 39 with a beveled flange 40 at one end and a threaded shoulder 41 on the other. The exterior housing 39 has an output lock ring 42 around its outside which has a shoulder for engaging the beveled flange 40. The inside diameter of the exterior housing 39 is larger than the outside diameter of the media screen 35 so that the exterior housing 39 can be slipped over the base pipe 30. With the base pipe 30 threaded to the output T-pipe 36, the exterior housing 39 is slid over the base pipe 30 until the beveled flange 40 engages the threaded flange 38 f the output T-pipe 36. The output lock ring 42 threads onto the male threads of the threaded flange 38 of the output T-pipe 36 to secure the exterior housing 39 to the output T-pipe 36. An output seal 43 is sandwiched between the beveled flange 40 and the threaded flange 38 to ensure a completely sealed connection.

The top of the filter canister 23 is closed with a flanged cap 44 and an input lock ring 45. An input seal 46 is placed between the flanged cap 44 and the threaded shoulder 41 of the exterior housing 39 and the input lock ring 45 is threaded onto the threaded shoulder 41 to completely seal the top of the filter canister 23. The flanged cap 44 also has a handle 47 on top for ease of handling.

The input feed line 24 is connected to the filter canister 23 at an input hole 48 cut in the side of the exterior housing 39. The input feed line 24 is welded to the exterior housing 39 to complete the connection.

In one embodiment of the invention, the exterior housing has a 5¼" outside diameter with a 4¼" inside diameter. The media screen is a Weatherford 6 or 8 gauge wire wrap completion screen applied to a 2⅜" base pipe. This wire wrap completion screen is fusion welded to longitudinal wire ribs of stainless steel metallurgy. The ribs provide a standoff for the wire wrap from the perforated pipe base to which the screen is afixed.

In some embodiments of the invention, the high pressure filter 20 utilizes three different types of filtration removal screens to insure adequate removal of a variety of particle sizes and volume. Design criteria for pressure requirements of a working unit are about 7,500 psi with a working pressure of about 500 psi. The high pressure filter 20 should handle a volume output of about 25 barrels per minute to insure sufficient annular velocity for hole cleaning. The high pressure filter 20 also has the ability to backflush and clean the filter surface because of the large amount of debris that can be present on a working drilling rig and displaced debris from a wellbore.

In some embodiments of the invention, the high pressure filter 20 has a series of steel cylinders designed to screw or set in place specially engineered canisters to extract a wide range of oil field debris or trash from the rig circulation system. In some embodiments of the invention, three types of screen design are used to meet the following needs: (1) a 12 gauge stainless wire wrap about a machined blank pipe to remove very course or large sized debris; (2) a 0.0825 micron metal screen attached to a blank pipe to facilitate removal of finer particles that would pass the larger 12 gauge canisters; and (3) a 0.0425 micron metal screen to provide unique filtration of completion fluids prior to gravel packing or fracture packing a well. In an alternative embodiment, three screens are used: a stainless steel wire wrap screen about a machined perforated blank pipe to remove very coarse or large size debris; a wire mesh attached to a perforated blank pipe to facilitate removal of finer particles that would pas the wire wrap; and a finer wire mesh screen filter device to provide unique filtration of completion fluids prior to gravel packing or frac packing a well. Particle sizes that could pass through the larger filter devices described above, could impair the performance of sand control procedures, if placed with gravel sand. In some embodiments of the invention where difference screen sized are implemented, multiple high pressure filters 20, such as the one illustrated in FIGS. 4A–4D are connected in series starting with the high pressure filter 20 having the more coarse screen size and working to the filter having the finer screen size.

It has been expressed that particle sizes that could pass through the larger filter devices described above, could impart the performance of sand controlled procedures, if placed with gravel sand.

In one embodiment of the invention, the high pressure filter 20 is built upon a 3' 6"×5' 6" platform with eight canister housings that are 4' 6" high. The inlet 21 and outlet 22 connections are 3" NPT to 3" piping to accommodate high volume, high-pressure fluid circulation. The canisters 23 are fitted with hammer unions to allow quick opening and removal or cleaning of the vessels and filtering devices.

Two or more filter racks, similar to the filter racks shown in FIGS. 4A–4D, may be incorporated into the system. This allows for one filter racks to be operational while another filter rack is taken off life for regeneration. A filter rack is regenerated by back flushing fluid through the filter or by removing the filter from the canister and rinsing the filter prior to reinsertion.

According to one embodiment of the invention, the high pressure filter 20 is an inline filter device which fits within a 7" casing. It sets upright to the derrick support beam. Fluid flows from choke manifold to standpipe and is not located in the work string. It has a pressure rating of about 5000 psi. Depending on the particular application, the high pressure filter 20 has a screen with the ability to back flush or clean easily such as a well water type screen. Debris capacity and flow rates through the device are criteria used to select the proper screen for the given application. High pressure valves control flow and/or isolate the filter from the standpipe. Sample valves are placed proximate to the system to monitor debris in the stream and down stream of the filter. A protocol for evaluating efficiency is used to enhance performance for the given application.

While the particular embodiments for Integrated Debris Management Systems as herein shown and disclosed in detail are fully capable of obtaining the objects and advantages hereinbefore stated, it is to be understood that they are merely illustrative of the preferred embodiments of the invention and that no limitations are intended by the details of construction or design herein shown other than as described in the appended claims.

What is claimed is:

1. A process for filtering fluid for circulation in a well, the process comprising:

standing the fluid a first time, whereby debris in the fluid is allowed to settle;

filtering under a first pressure the fluid of said standing the fluid a first time, whereby further debris is removed from the fluid;

standing the fluid a second time, whereby further debris is allowed to settle; and filtering the fluid of said standing the fluid a second time under second pressure, wherein the second pressure is higher than the first pressure, whereby further debris is removed from the fluid.

2. A process as claimed in claim 1, wherein said standing the fluid a first time comprises pumping the fluid into a first settling tank and allowing the fluid to stand substantially still for a period of time, wherein said standing the fluid a second time comprises pumping the fluid into a second settling tank and allowing the fluid to stand substantially still for a period of time.

3. A process as claimed in claim 1, wherein said filtering under a first pressure the fluid of said standing the fluid a first time comprises pumping the fluid through a filter.

4. A process as claimed in claim 1, wherein said filtering under a second pressure the fluid of said standing the fluid a second time comprises pumping the fluid through a filter.

5. A process as claimed in claim 1, further comprising regenerating a filter used in said filtering under a second pressure.

\* \* \* \* \*